(12) United States Patent
Ohkawa

(10) Patent No.: US 6,334,690 B1
(45) Date of Patent: *Jan. 1, 2002

(54) SURFACE LIGHT SOURCE DEVICE OF SIDE LIGHT TYPE AND LIQUID CRYSTAL DISPLAY

(75) Inventor: Shingo Ohkawa, Koshigaya (JP)

(73) Assignee: Enplas Corporation, Kawaguchi (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/260,720

(22) Filed: Mar. 2, 1999

(30) Foreign Application Priority Data

Mar. 6, 1998 (JP) .......................................... 10-073394

(51) Int. Cl.$^7$ ........................... F21V 8/00; G02F 1/1335
(52) U.S. Cl. ........................ 362/31; 362/330; 362/333; 349/64; 349/65
(58) Field of Search ............................... 349/62, 64, 65, 349/67; 362/31, 330, 333

(56) References Cited

U.S. PATENT DOCUMENTS

| | | | | |
|---|---|---|---|---|
| 4,252,416 A | * | 2/1981 | Jaccard ........................ | 349/65 |
| 4,737,896 A | * | 4/1988 | Mochizuki et al. ........... | 349/62 |
| 5,400,224 A | * | 3/1995 | DuNah et al. ................ | 362/31 |
| 5,521,796 A | * | 5/1996 | Osakada et al. .............. | 362/31 |
| 5,712,694 A | * | 1/1998 | Taira et al. ................... | 349/62 |
| 5,796,450 A | * | 8/1998 | Kanda et al. ................. | 349/64 |
| 5,899,552 A | * | 5/1999 | Yokoyama et al. ........... | 362/31 |
| 5,997,148 A | * | 12/1999 | Ohkawa ....................... | 362/31 |

FOREIGN PATENT DOCUMENTS

| | | |
|---|---|---|
| CN | 322531 | 12/1997 |
| CN | 322534 | 12/1997 |

* cited by examiner

Primary Examiner—Alan Cariaso
(74) Attorney, Agent, or Firm—Staas & Halsey LLP

(57) ABSTRACT

A surface light source device of side light type 1 comprises a guide plate 2, a reflection sheet 4 and a light control member 5. Primary light sources 3 are disposed beside incidence end faces located oppositely to each other across the guide plate 2, respectively. Illumination light L propagates as to approach the oppositely located incidence end faces while being reflected repeatedly by a back face 2B and an emission face 2C. The back face 2B of the guide plate 2 is provided with a great number of fine projection rows. Each of the projection rows has a pair of slopes 2E, 2F running approximately at the right angle with respect to the incidence end faces 2A. These projection rows modify emission directivity toward a frontal direction of the emission face 2C regarding in a plane parallel with the incidence end faces 2A while giving effective output from the emission face 2C. Illumination light outputted from the emission face 2B, which provides an emission promoting face, illuminates a LCD panel LP through the light control member 5. The emission promoting face may be provided with scattering power which is stronger in a center portion as compared with around the incidence end faces.

18 Claims, 10 Drawing Sheets

1: SURFACE LIGHT SOURCE DEVICE OF SIDE LIGHT TYPE

1: SURFACE LIGHT SOURCE DEVICE OF SIDE LIGHT TYPE

SURFACE LIGHT SOURCE DEVICE OF SIDE LIGHT TYPE AND LIQUID CRYSTAL DISPLAY

BACKGROUND

1. Field of the Invention

The present invention relates to a surface light source device of side light type and a LCD (liquid crystal display) with backlighting arrangement to which the surface light source device is applied. In particular, the present invention relates to improvement of the surface light source device employing guide plate provided with two incidence end faces, the improvement providing an increased emission toward a frontal direction (direction of a normal with respect to an emission face of the guide plate) and corresponding providing an improved screen luminance of the LCD.

2. Related Art

Surface light source devices of side light type are well known as devices for outputting illumination flux with large cross section, being applied to illumination such as backlighting of LCD.

A surface light source devices of side light type disposed for backlighting of LCD supplies a LCD panel with illumination light from behind the LCD panel. In general, a surface light source devices of side light type comprises a guide plate and a primary light source. The guide plate has major faces, one providing an emission face and the other providing a back face. The primary light source is disposed besides an incidence end face (a minor face) of the guide plate to supply the guide plate with primary light through the incidence end face.

This arrangement is suitable for thin-shaped overall structure. The primary light source is usually a rod-shaped light source such as cold cathode lamp. Point-like light sources such as LED (Light Emitting Diode) are employed in some cases. Illumination light emitted from the primary light source is introduced into the guide plate through the incidence end face. Thus introduced illumination light propagates within the guide plate, providing illumination output from the emission face of the guide plate on the way of propagation.

A typical and known guide plate is uniform in thickness overall and another typical and known guide plate has wedge-shaped cross section. According an prior art applied to the former, primary light is supplied through two end faces (i. e. minor faces providing incidence end faces) opposing to each other (i. e. oppositely located to each other).

Primary light is supplied by, for instance, rod-like cold cathode lamps which are disposed beside the incidence end faces, respectively. This will give greater illumination output compared with a surface light source device of side light type which is supplied with primary light through only one incidence end face. In some cases, an emission face or a back face of the guide provides a rough surface or a micro-lens surface to promote emission from the guide plate. Such a surface is called "emission promoting face".

Surface light source devices of side light type with strong illumination output are suitable for backlighting of LCD applied to, for instance, car navigation system. This is because bright display will enable information indication to be instantaneously read.

The above-mentioned surface light source device supplied with primary light through both incidence end faces is not free from problem that emission to a frontal direction (direction of a normal with respect to the emission face) tends to be short, either.

OBJECT AND SUMMARY OF INVENTION

An object of the present invention is to provide a surface light source device of side light type improved so that emission to a frontal direction of a guide plate (i. e. direction of a normal with respect to an emission face) increases and to provide a LCD provided with a backlight arrangement to which the surface light source device is applied.

The present invention is directed to an improvement of surface light source device of side light type which comprises a guide plate, having major faces to provide an emission face and a back face and being provided with a pair of incidence end faces located oppositely to each other across the guide plate, and a primary light source to supply primary light through the pair of incidence end faces.

According to the improvement, the back face is provided with a great number of fine projection rows. Each projection row has a pair of slopes running approximately at the right angle with respect to the incidence end faces. The emission face provides an emission promoting face to promote illumination light output. The emission promoting face may be a light scattering face which scatters illumination light at the emission face. Scattering power of the light scattering face preferably tends to be increasing toward a central portion from both incidence end faces of the guide plate.

It is also preferable that a light control member is disposed along an emission face of the guide plate employed in the surface light source device to correct directivity toward a frontal direction regarding in a plane perpendicular to the incidence end faces.

Furthermore, the present invention provides an improved liquid crystal display by arranging the improved surface light source device behind a LCD panel.

Increased emission to a direction of a normal is achieved by a great number of projection rows formed on the back face of the guide plate.

Since individual pair of slopes forming each projection row run approximately at right angle with respect to the incidence end faces, directivity correction is effected so that emission is gathered inward from right and left as viewed from an incidence end face. The emission face providing an emission promotion face scatters inner incidence light to promote emission. The emission promotion face may be, for instance, a matted face or a face to which light diffusive ink is deposited.

If scattering power of the light scattering face tends to be increasing toward a central portion from both incidence end faces of the guide plate, short of emission is prevented, which otherwise would tend to occur in the central portion distant from both incidence end faces.

Features of a surface light source device in accordance with the present invention is reflected onto image display quality of LCD with backlighting to which the surface light source device is applied, leading to an increased luminance as viewed from a frontal direction (direction of a normal) with respect to the display screen.

The above-described and the other features will be easily understood from detailed description of the embodiments with referring to the drawings.

EMBODIMENT (1) First Embodiment

Figure 1:
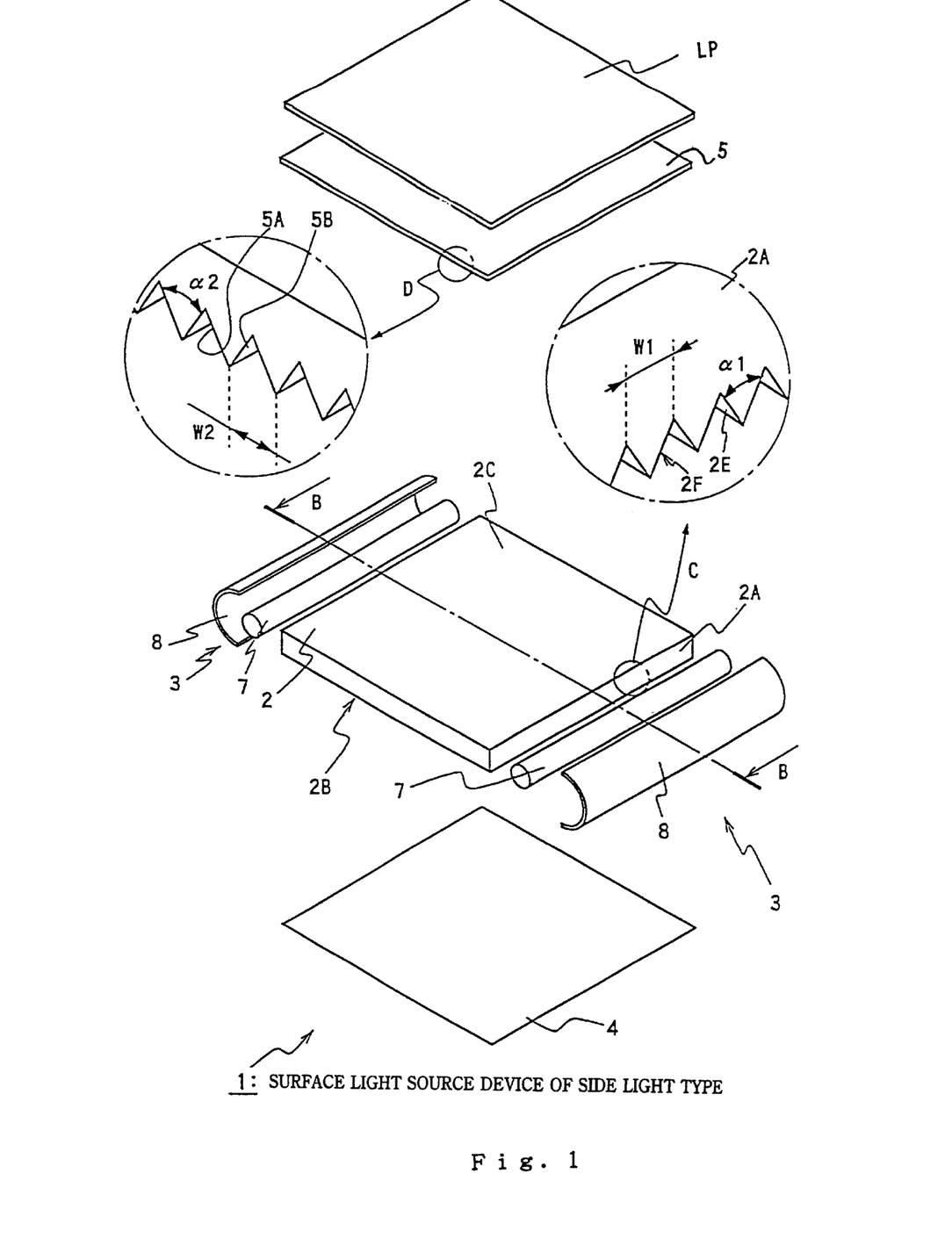
FIG. 1 is an exploded perspective view of an arrangement in which a surface light source device of side light type according to a first embodiment of the present invention is applied to backlighting for LCD.
Figure 2:
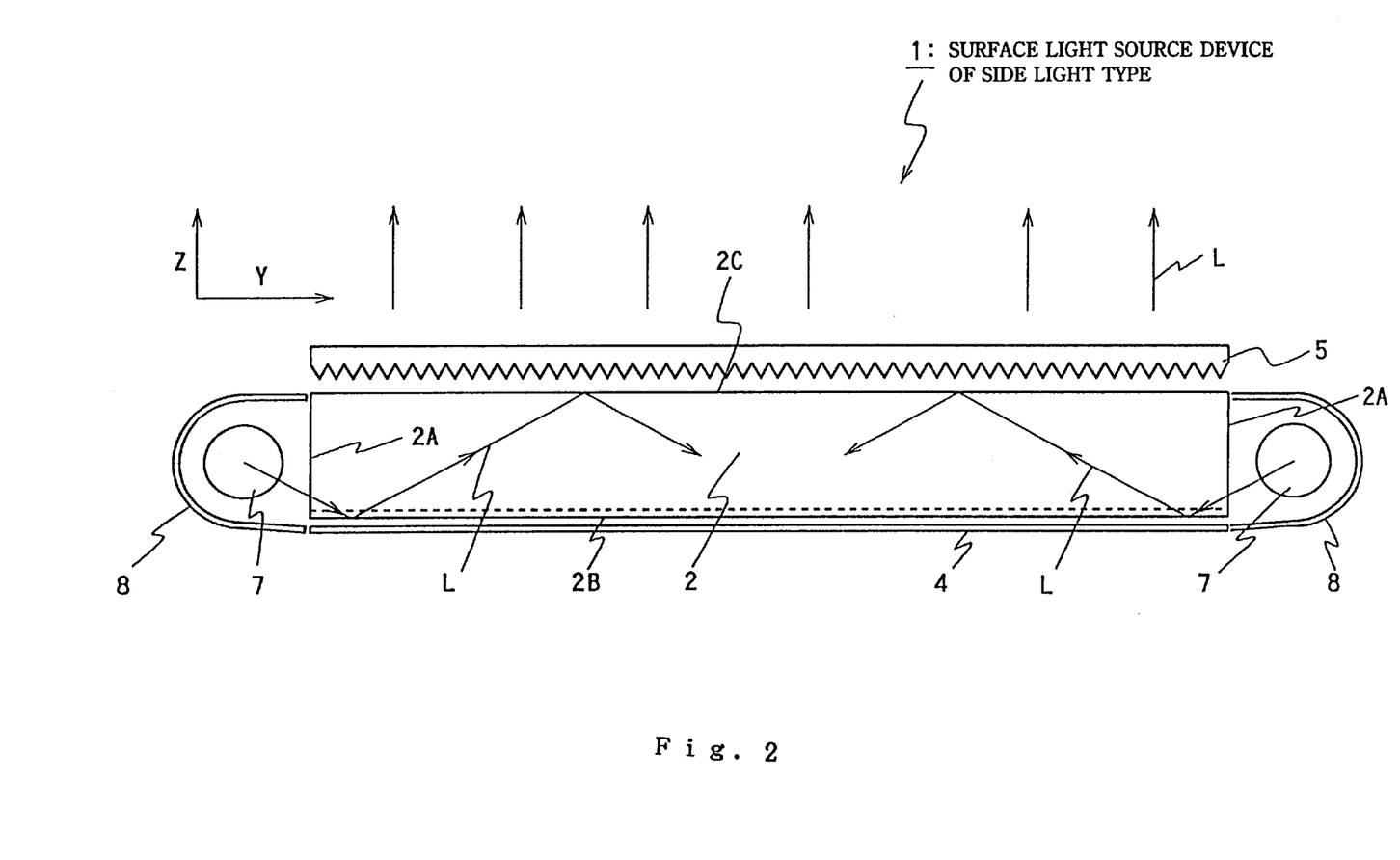
FIG. 2 is a cross section view of the surface light source device of side light type shown in FIG. 1 along line B—B therein.

Referring to FIG. 1 and FIG. 2, a surface light source device of side light type 1 comprises a guide plate 2, two primary light sources 3, a reflection sheet 4 and a flexible prism sheet 5 as a light control member. The reflection sheet 4, the guide plate 2 and the prism sheet 5 are laminatedly arranged in order. Each of the primary light sources 3 is disposed beside each of end faces (incidence end faces) which are located at opposite sides of the guide plate 2. Each primary light source 3 is, for instance, composed of a cold cathode lamp (fluorescent lamp) 7 backed by a reflector 8. Illumination light (primary light) emitted from the fluorescent lamps 7 is supplied to the incidence end faces of the guide plate 2 through openings of the reflectors 8. The reflectors 8 are made of sheet members with regular or irregular reflectivity.

The reflection sheet 4 is made of, for instance, a sheet-like regular reflection member with silver evaporation-deposited, which reflects light leaked from the guide plate 2 to return the leaked light to the guide plate 2. This prevents loss of light energy.

The guide plate 2 is transparent plate member which has a uniform thickness overall and is made of, for example, an acrylic resin (PMMA resin). Such a guide plate 2 is produced by means of, for example, injection molding.

Illumination light L introduced into the guide plate 2 through each incidence end face propagates to approach the counter incidence end face while being subject to repeated reflections between a back face 2B and an emission face 2C. Reflections at the back face 2B and the emission face 2C involve partial emission from the guide plate 2. Light escaped from the back face 2B is returned into the guide plate 2 directly or via the reflection sheet 4. Light escaped from the emission back face 2C is directed to a LCD panel LP via a prism sheet 5. Illustration of the LCD panel LP is omitted in FIG. 2.

Referring to partial enlarged illustration indicated by arrow C, The back face 2B of the guide plate 2 is provided with a great number of fine projection rows extending approximately at right angle with respect to the incidence end face 2A. Each projection row includes a pair of slopes 2E, 2F extending approximately at right angle with respect to the incidence end face 2A.

In this embodiment, each pair of slopes 2E, 2F are directly connected, giving a triangular cross section to each projection row. The projection rows correct emission directivity regarding in a plane parallel to the incidence end face 2A so as to be directed to a frontal direction (vertical direction) with respect to the emission face 2C while contributing to effective illumination output from the emission face 2C. This is an important feature of the present invention.

Upon inner impinging of illumination light propagating within the guide plate 2 to the back face 2B, reflection is effected by either slope 2E or 2F. Inner reflection by the back face 2B (slopes 2E, 2F) produces inner reflection light having propagation directions which are much gathered to a frontal direction regarding in a plane parallel to the incidence end face 2A in comparison with under a provisional condition such that the back face 2B is flat (i.e. without slopes 2E, 2F). This leads to an increased output component which is directed to a normal direction with respect to the emission face 2C.

Figure 3:
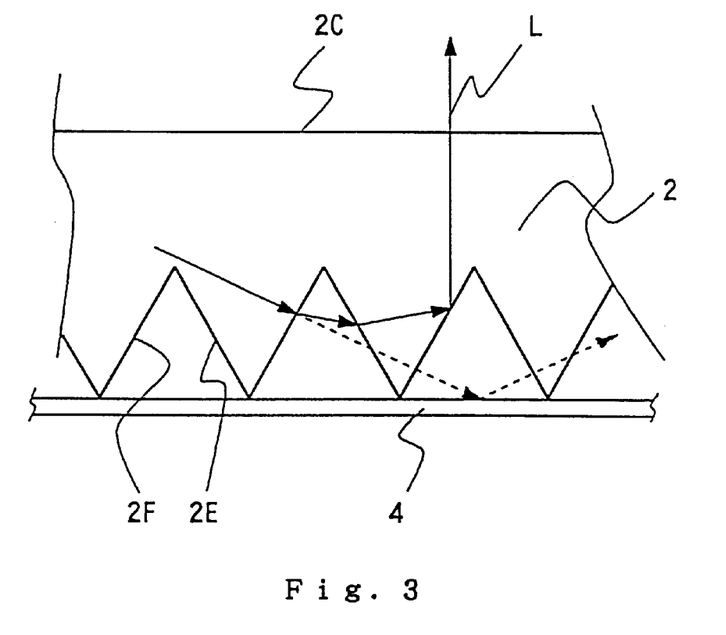
FIG. 3 is a cross section view to illustrate a back face of a guide plate employed in the surface light source device shown in FIG. 1.

It should be noted that some of the inner impinging light to the back face 2B gives illumination light L which impinges upon the slope 2F (or 2E) at small incident angles, once escaping out of the guide plate 2 through the slope 2F (or 2E) as shown in FIG. 3.

Such escaping light is, however, returned into the guide plate 2 through a slope 2E (or 2F) of an other projection row, then being directed to the emission face 2C via the slope 2F (or 2E) of the same projection row. Since this illumination light impinges upon the emission face 2C at small incident angles, being emitted therefrom easily. Nevertheless some component is, as indicated with a corrugated line, returned into the guide plate 2 after being reflected by the reflection sheet 4, such component is directed to the emission face 2C, too.

Inner impinging illumination light L as above would be hardly converted into a frontal emission if the back face 2B were flat (i.e. without slopes 2E, 2F). The slopes 2E, 2F make conversion into a frontal direction easy. Accordingly, illumination output from the guide plate 2 will have an intensified directivity to a frontal direction with respect to the emission face 2C.

Furthermore, guiding of illumination light from the back face 2B to the emission face 2C followed by emission therefrom is achieved more positively compared with under the provisional condition such that the back face 2B is flat (i.e. without slopes 2E, 2F), with the result that overall emission efficiency is improved.

In this embodiment, each pair of slopes 2E, 2F have an equal inclination angle to each other with respect to the emission face 2C, providing a vertical angle α1 which is about 100 degrees. In general, angle α1 falls within a practical range from 50 degrees to 130 degrees, and preferably within a range from 60 degrees to 110 degrees.

Repetition pitch W1 of the projection rows is preferably not greater than a quarter of pixel pitch of the LCD panel LP; for example, W1=50 μm.

This prevents Moire fringes which would appear when periodically arranged pixels of the LCD panel LP and also periodically arranged projection rows of the back face 2B are overlapped. More fringes would look like fine unevenness in luminance, leading to reduction in illumination output quality. And they would cause display quality to be reduced if the surface light source device is applied to backlighting for LCD.

The emission face 2C of the guide plate 2 forms an emission promoting face. The emission promoting face may be, for instance, a matted face or a face to which light diffusive ink is applied. Such an emission promoting face scatters illumination light L propagating within the guide plate 2 to promote emission. Accordingly an exemplary emission face 2C, mat-processing is applied to the emission face 2C overall. This gives a feeling of roughness to the emission face 2C to provide a uneven face scattering inner impinging light.

In this embodiment, uniform scattering power is given to the whole area of the emission face (emission promoting face) 2C. Provided that the emission face 2C is a flat face (not an emission promoting face), a remarkable portion of the inner impinging light would be subject to total reflection, being able to escape out of the guide plate 2. The emission promoting face relieves such restriction to make emission easy.

The prism sheet 5 has one face to provide a prismatic surface and is orientated so that the prismatic surface is directed to the guide plate. The prismatic surface is provided with a great number of fine projection rows as shown in FIG. 1 with partial enlarged illustration indicated by arrow D. Each projection row includes a pair of slopes 5A, 5B extending approximately in parallel with respect to the incidence end face 2A of the guide plate 2. In this embodiment, each pair of slopes 5A, 5B are directly connected, giving a triangular cross section to each projection row.

Figure 4:
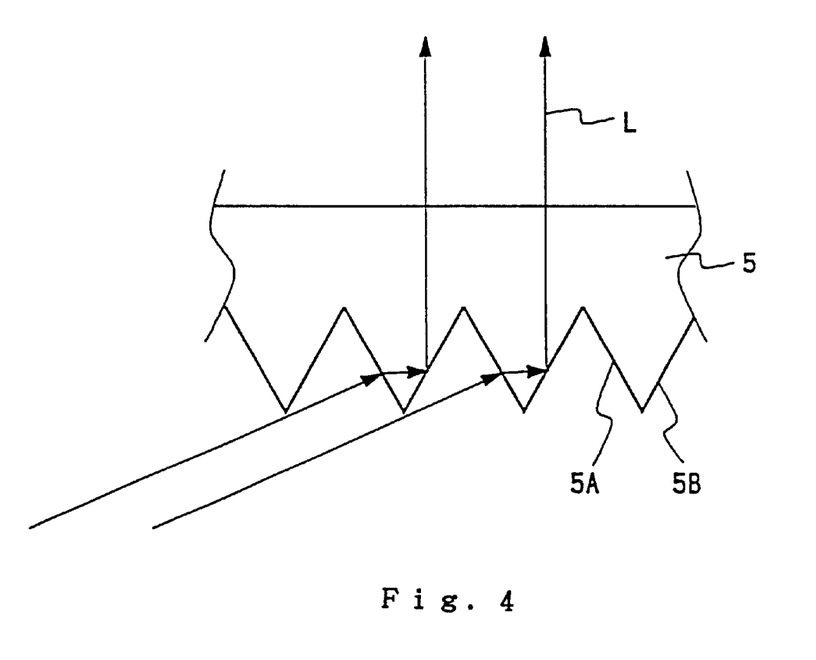
FIG. 4 is a cross section view to illustrate a prism sheet employed in the surface light source device shown in FIG. 1.

As illustrated in FIG. 4, illumination light L from the emission face 2C is introduced into the prism sheet 5 through a slope 5A which is located relatively near to the incidence end face 2A, then being reflected by the other slope 5B which is located relatively far from the incidence end face 2A to provide a frontal output from the emission face 2C (i.e. upward in FIG. 4). The prism sheet 5 thereby corrects directivity of emitted light regarding in a plane perpendicular to the incidence end face 2A so as to be directed to a frontal direction with respect to the emission face 2 C.

In this embodiment, each pair of slopes 5A, 5B have an equal inclination angle to each other with respect to the emission face 2C. Vertical angle α2 made by each pair of slopes 5A, 5B is about 66 degrees. A practical range of angle α2 is from 30 degrees to 70 degrees and a preferable range is from 50 degrees to 70 degrees, in particular from 60 degrees to 70 degrees.

Repetition pitch W2 of projection rows of the prism sheet 5 is also preferably not greater than a quarter of pixel pitch of the LCD panel LP; for example, W2=50 μm.

This prevents Moire fringes which would appear when periodically arranged pixels of the LCD panel LP and also periodically arranged projection rows of the prism sheet 5 are overlapped. As described above, Moire fringes would look like fine unevenness in luminance, leading to reduction in illumination output quality. And they would cause display quality to be reduced if the surface light source device is applied to backlighting for LCD.

A brief summary of behaviour of light in this embodiment is as follows.

Illumination light L emitted from a pair of fluorescent lamps 7 (see FIG. 1 and FIG. 2) is, directly or after being reflected by the reflector 8, introduced into the guide plate 2 through the incidence end faces 2A opposing to each other.

Illumination light L propagates within the guide plate 2 so that repeated reflections are effected between the back face 2B and the emission face 2C to approach another incidence end face 2A oppositely located. Some emission out of the guide plate 2 occurs on the reflections at the back face 2B and the emission face. As aforedescribed, light escaped from the back face 2B is returned into the guide plate 2 directly or via the reflection sheet 4. The reason why direct return into the guide plate 2 is achieved is, as explained with referring to FIG. 3, that the back face is provided with the projection rows. Light emitted from the emission face 2C undergoes direction correction effected by the prism sheet 5, then being directed to the LCD panel LP.

It is important that much of light coming to the back face 2B is positively converted into inner propagating light which is directed to the emission face 2C forming an emission promoting face and is then easily outputted therefrom. As a result, increased is emission directivity toward a frontal direction (i.e. a direction of a normal) with respect to the emission face 2C. Besides, increased total emission from the guide plate 2 is expected. Provided that the back face 2B is flat (i.e. without slopes 2E, 2F), such effects would not be expected.

These effects will be understood from examples of measurement data as shown in FIGS. 5 to 8. In the graphs, coordinate indicated by Xθ represents angle with respect to a plane parallel with the incidence end face 2A while coordinate indicated by Yθ represents angle with respect to a plane perpendicular to the incidence end face 2A. A direction of a normal with respect to the emission face 2C corresponds to Xθ=Yθ=0. Plotted curves express relative intensity depending on directions with height from the Xθ-Yθ plane.

Figure 5:
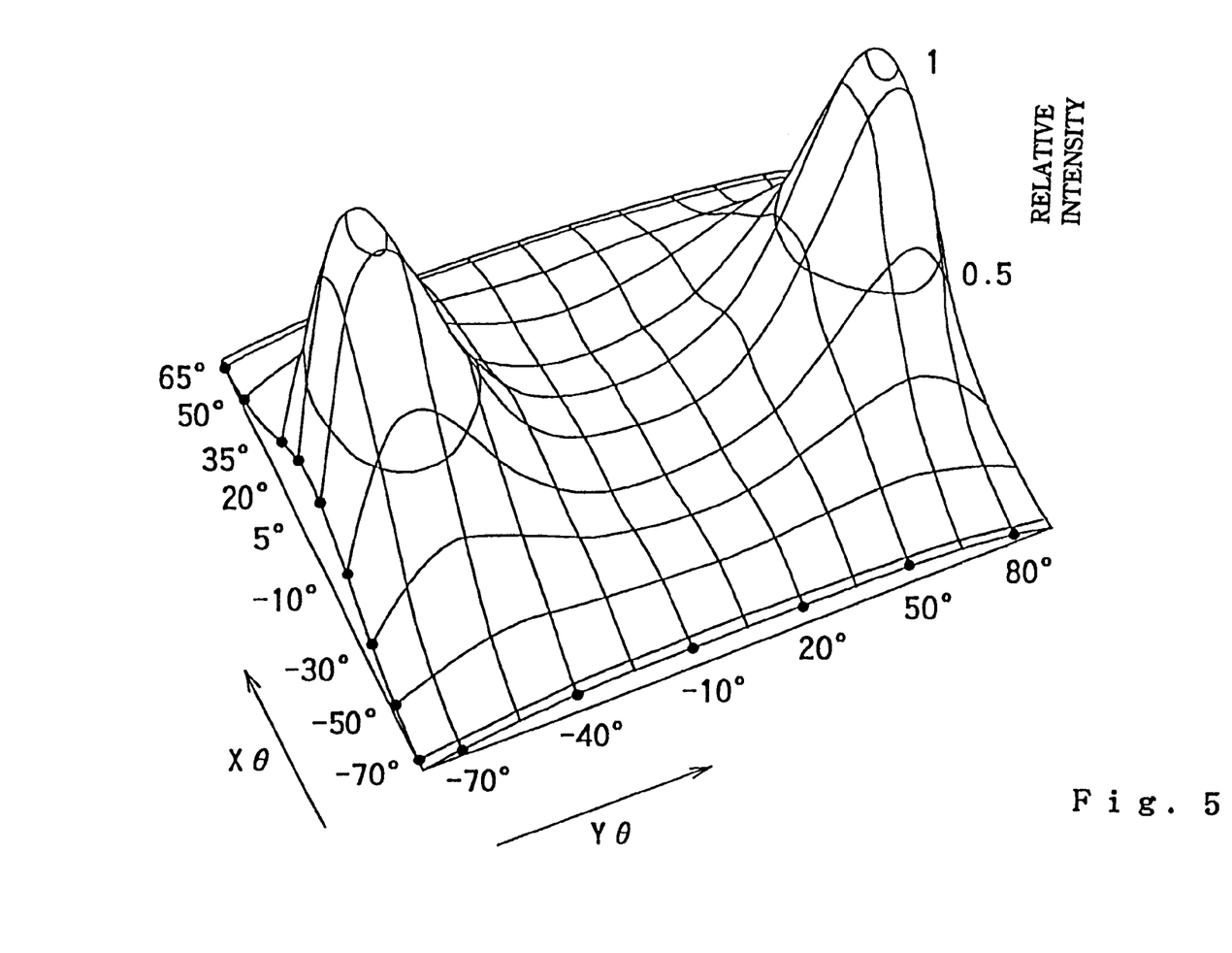
FIG. 5 is a graph showing directional characteristics of emission from the guide plate employed in the surface light source device shown in FIG. 1.

FIG. 5 is a graph showing directional characteristics of emission from the guide plate employed in the surface light source device shown in FIG. 1. And FIG. 6 is a graph showing directional characteristics of emission from a guide plate having a flat back ice.

Figure 6:
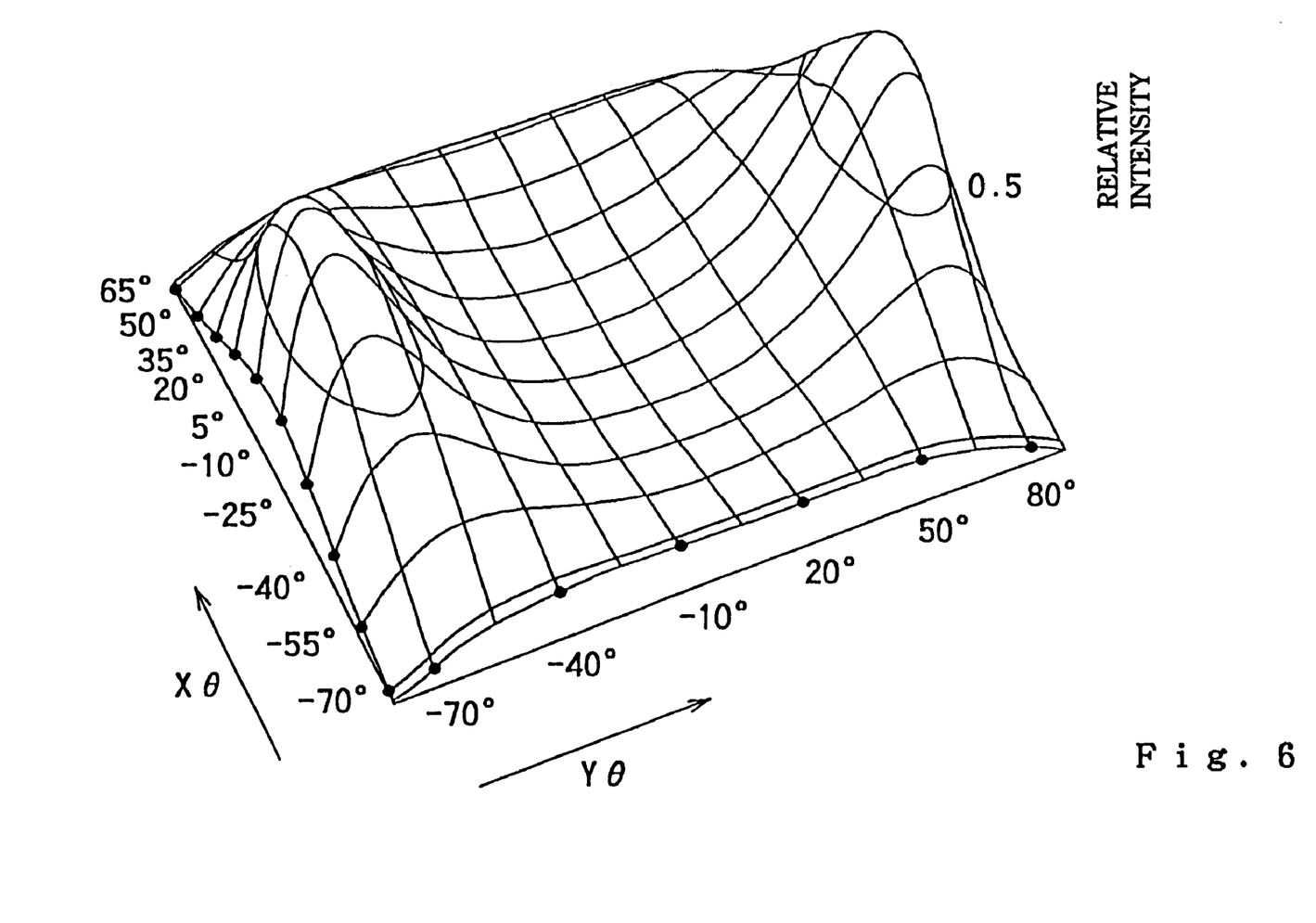
FIG. 6 is a graph showing directional characteristics of emission from a guide plate having a flat back face in order to be compared with FIG. 5.

Referring to FIG. 6, a considerably high relative intensity is marked by such illumination light as emitted divergently outward in a plane parallel to the incidence end ace 2A. In other words, emission toward frontal directions with respect to the emission face 2C is not enough.

On the other hand, referring to FIG. 5, a fairly low relative intensity is marked by such illumination light as emitted divergently outward in a plane parallel to the incidence end face 2A. That is, correction of emission directivity toward frontal directions with respect is achieved.

Figure 7:
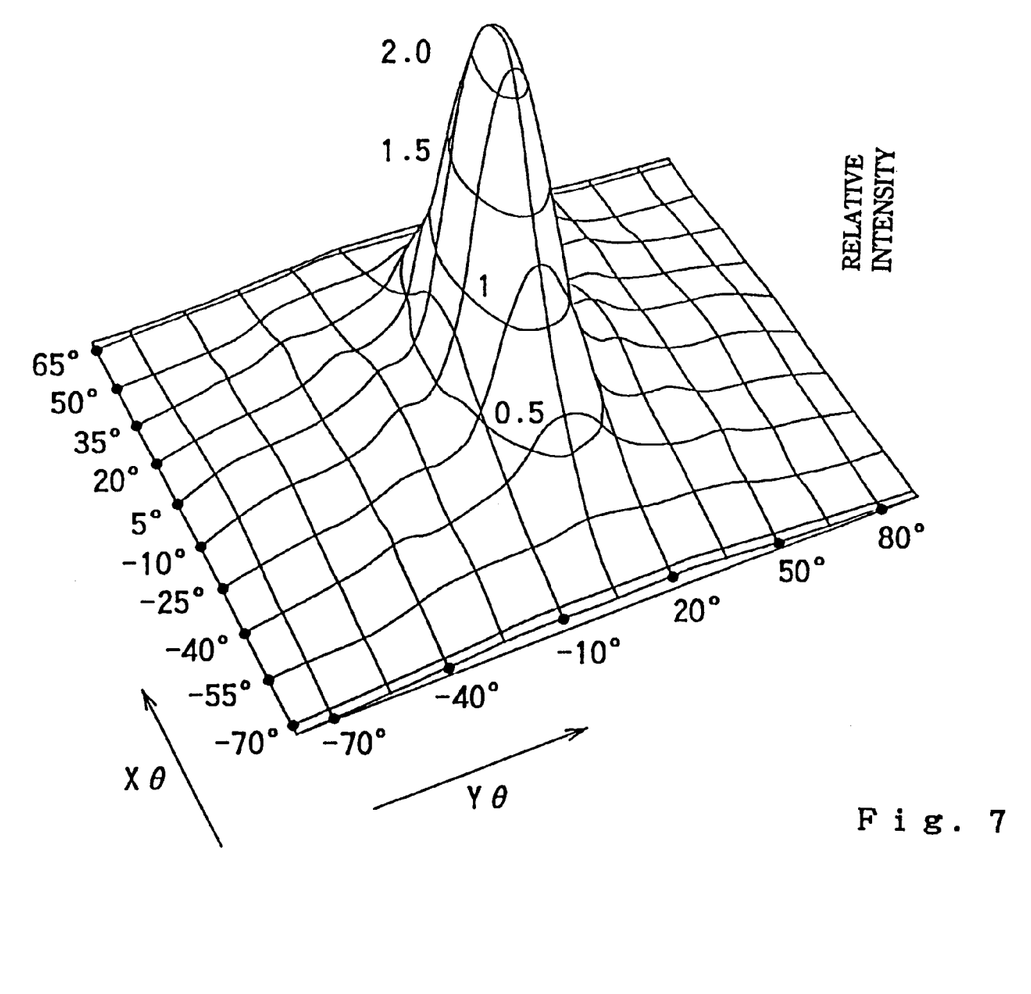
FIG. 7 is a graph showing directional characteristics of output emission (emission from the prism sheet) yielded by the surface light source device shown in FIG. 1.
Figure 8:
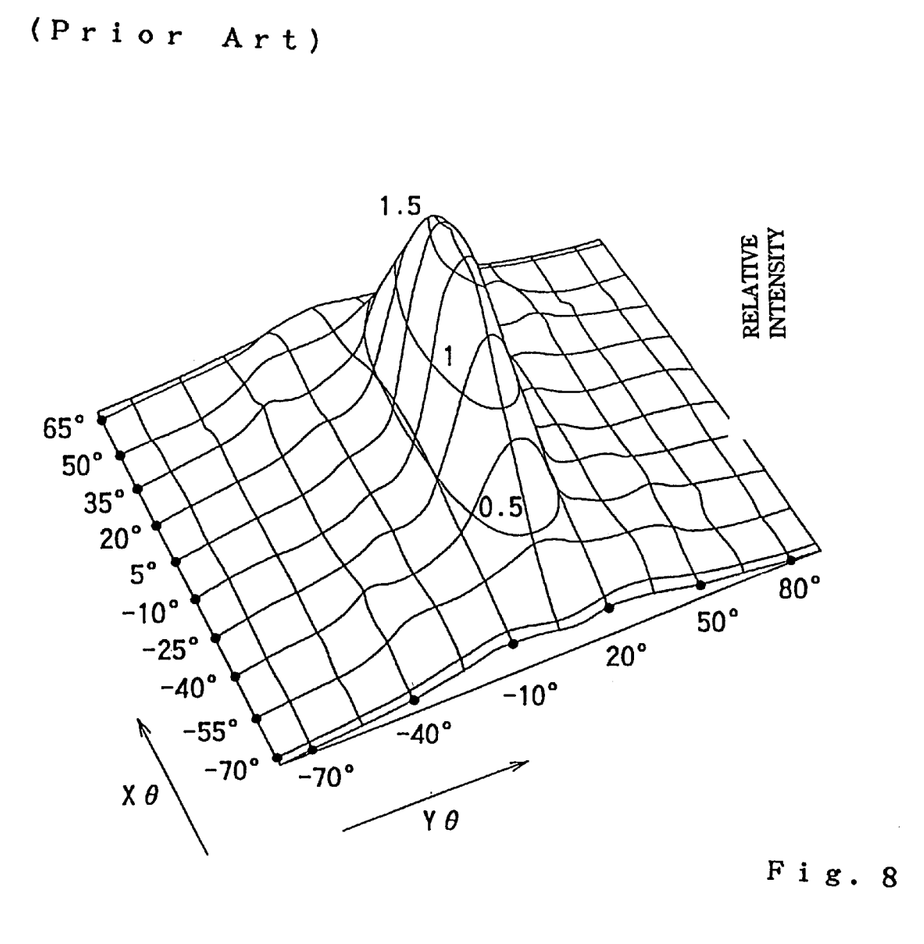
FIG. 8 is a graph showing directional characteristics of output emission (emission from the prism sheet) yielded by a surface light source device employing a guide having a flat back face in order to be compared with FIG. 7.

It is understood from FIG. 7 and FIG. 8 that such difference in characteristics is inherited to output of the surface light source device (i.e. illumination light after transmitting the prism sheet 5).

FIG. 7 is a graph showing directional characteristics of output emission (emission of the surface light source device shown in FIG. 1. On the other hand, FIG. 8 is a graph showing directional characteristics of output emission of a surface light source device employing a guide having a flat back face.

In the first place, it is understood by comparing FIG. 7 with FIG. 5 as well as comparing FIG. 8 with FIG. 6 that the prism sheet 5 corrects directivity inclined in a plane perpendicular to the incidence end face 2A so as to give a frontal directivity with respect to the emission face 2C.

Secondly, it is understood by comparing FIG. 7 with FIG. 8 that the projection on the back face 2B enables illumination to be outputted much sharply toward the frontal direction with respect to the emission face 2C.

It is noted that the prior art (FIG. 8) produces a couple of small peaks (parasitic peaks) around a large peak of the frontal direction. Contrary to this, the present embodiment (FIG. 7) restrains such parasitic peaks, thereby giving a natural emission directivity to the illumination output.

Figure 9:
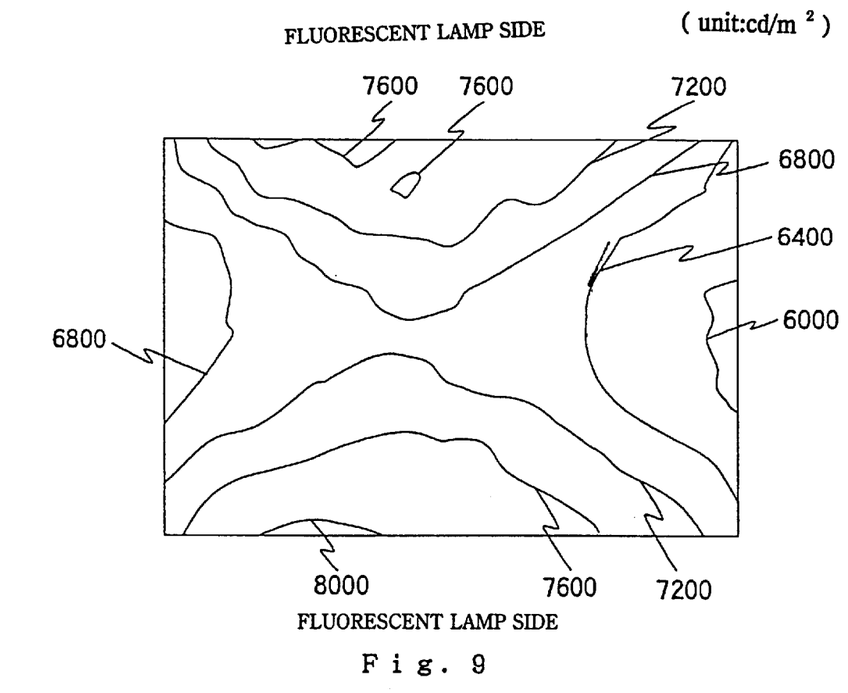
FIG. 9 is an iso-luminance diagram showing a luminance distribution of output emission yielded by the surface light source device shown in FIG. 1.
Figure 10:
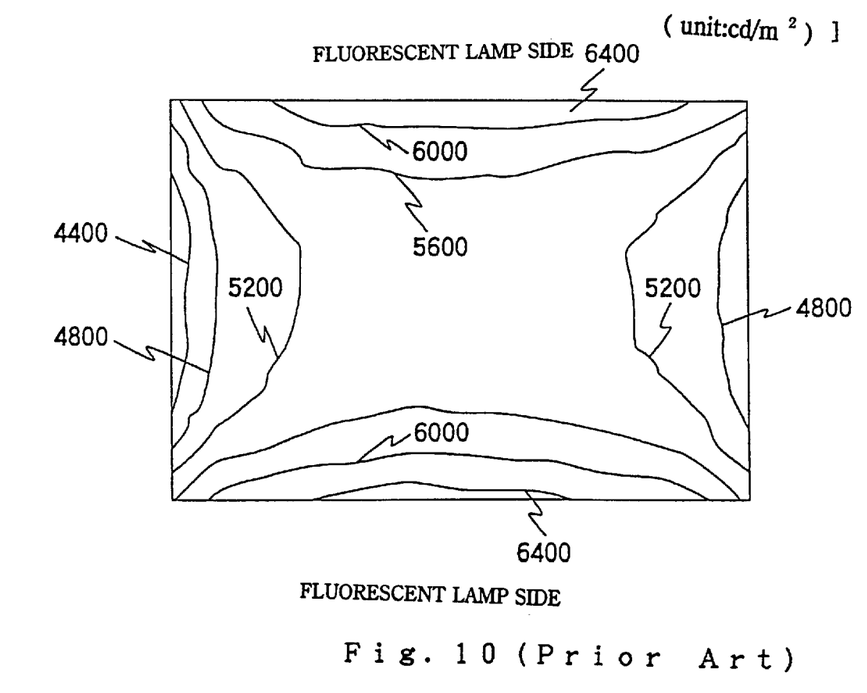
FIG. 10 is an iso-luminance diagram showing a luminance distribution of output emission yielded by a surface light source device employing a guide having a flat back face in order to be compared with FIG. 9.

Next, FIG. 9 is an iso-luminance diagram showing a luminance distribution of output emission yielded by the surface light source device shown in FIG. 1. And FIG. 10 is an iso-luminance diagram showing a luminance distribution of output emission yielded by a surface light source device employing a guide having a flat back face in order to be compared with FIG. 9. In both the diagrams, luminance of emission face was measured from a normal direction. It is understood by referring to both the diagrams that the present embodiment (FIG. 9) provides a prominently increased luminance as compared with the prior art (FIG. 10).

(2) Second Embodiment

Figure 11:
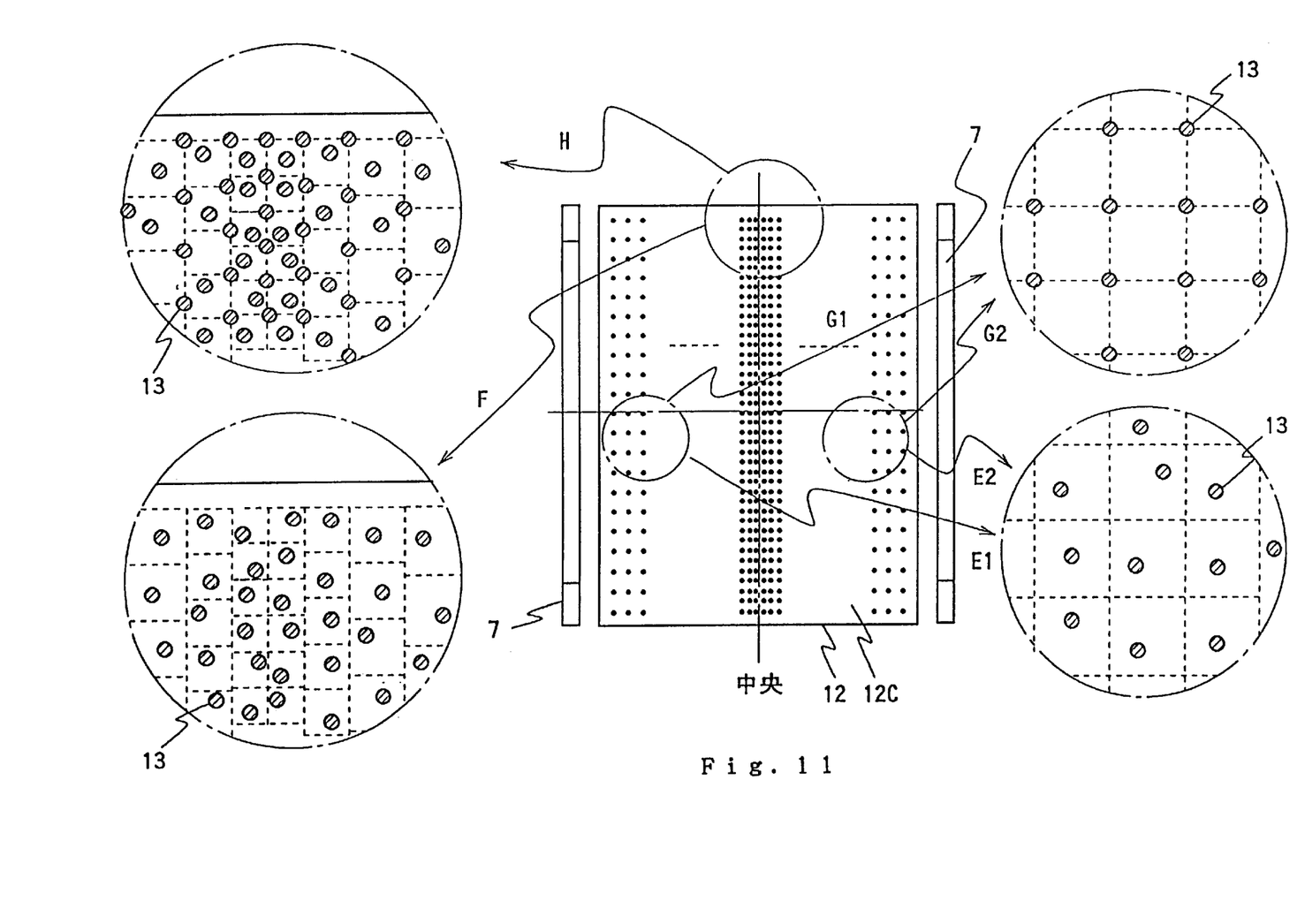
FIG. 11 is a plan view to illustrate a guide plate employed in a surface light source device shown according to a second embodiment of the present invention; and, FIG. 12 is a an iso-luminance diagram showing a luminance distribution of output emission yielded by the surface light source device according to the second embodiment.

The present embodiment is in common with the first embodiment except that a guide plate 12 as shown in FIG. 11 is employed instead of the fore-described guide plate 2. Accordingly, repeated descriptions are omitted as possible.

The guide plate 12 is the same as the guide plate 12 (employed in the first embodiment) except that emission promoting face is differently embodied. The emission face (emission promoting face) of the guide plate 12 is provided with scattering power which tends to increase as approaching a central portion from both the incidence end faces, respectively. That is, the degree of illumination output promotion increases toward the central portion from around the respective incidence end faces. This prevents reduction in brightness from causing around the central portion relatively distant from the respective incidence end faces.

In the present embodiment, mat-processing is applied to form a light scattering face which is provided with a great number of fine circular (dot-like) light diffusing elements (fine rough surface region elements) 13. Degree of scattering power is adjustable through covering rate of the light diffusing elements 13. Covering rate can be varied depending on factors such as size or formation pitch of the individual light diffusing elements 13. Such distributed light diffusing elements 13 are called light scattering pattern occasionally.

Size of the individual light diffusing elements 13 is so small (such as 50 $\mu$m in diameter) as to be hardy observed through the emission face 12C. According to an arrangement of scattering pattern, number of light diffusing elements 13 per unit area is increasing toward the central portion of the guide plate 12 from the vicinities of fluorescent lamps 7, as indicated with E1, E2 and F in FIG. 11.

According to a manner of design, luminance distribution of a guide plate having no light diffusing element 13 is measured. On the basis of the results of the measurement, covering rate of light diffusing elements 13 is set over the while emission face 12C according to a suitable calculation formulas. Boxes are set according to the covering rate so that formation pitch is varied as increasing gradually toward the respective incidence end faces from the central portion.

A constant number of light diffusing elements 13 are arranged randomly in each box. If such pitch variation fails to provides enough covering rate, an additional random arrangement of light diffusing elements 13 may be employed.

Arrangement manners of light diffusing elements 13 allow diverse variations. Instead of the random arrangement indicated with E1, E2, F, light diffusing elements 13 may be regularly arranged at corners of the respective boxes as indicated with G1, G2. Otherwise, a combination of a regular arrangement and irregular arrangement may be employed as indicated with H.

Figure 12:
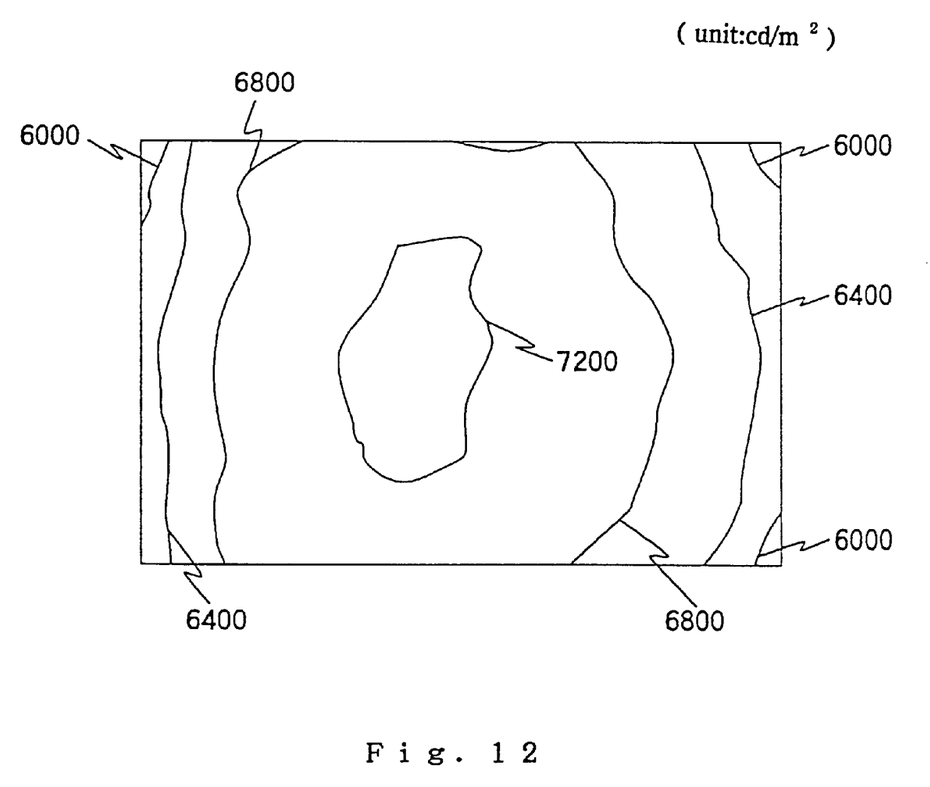

FIG. 12 is an iso-luminance diagram showing a luminance distribution of output emission yielded by the surface light source device according to the second embodiment.

A prominently higher luminance is marked around the central portion of the emission face 12C as compared with Fig.9 (the first embodiment), while luminance gives a gentle reduction toward surroundings. Such a luminance distribution provides a natural and mild visual feeling which is frequently desired by device users.

As described above, both of the first embodiment and the second embodiment provide high-quality illumination output with high efficiency according to the features of the present invention, in particular, application to backlighting of LCD will give bright and high-quality display.

(3) Modifications

None of the above embodiments aim to be limitative for the scope of the present invention. For instance, the following modifications are allowed.

(a) In the second embodiment, the individual light diffusion elements are circular. However, this imposes no limitation on the present invention. Other shapes such as regular may be employed.

(b) In the second embodiment, total distribution of light diffusion elements is designed according to a manner such that a light diffusing pattern of a random arrangement is added to a matrix-like arrangement of light diffusion elements. However, this imposes no limitation on the present invention.

For instance, total distribution of light diffusion elements may be designed according to only a regular arrangement or only a random arrangement.

(c) In the second embodiment, fight diffusion elements are fine rough surface areas which are produced by mat-processing. However, this imposes no limitation on the present invention.

For instance, light diffusion elements may be produced by applying light scattering ink containing a pigment such as magnesium carbonate or titanium oxide. Further, a great number of uneven portions like micro-lenses may be formed on the emission face to provide an emission promoting face by means of metal molding, printing or other methods.

(d) In the above embodiments, each of the projection rows on the back face of the guide plate is in the form of a direct connection of a pair of slopes, providing a triangular cross section. However, this imposes no limitation on the present invention.

For instance, each pair of slopes may be connected to each other via a curved face to form a projection row. Alternatively, each pair of slopes themselves may be curved faces.

(e) In the above-described embodiments, the guide plates are made of transparent acrylic resin. However, this imposes no limitation on the present invention. Various materials may be employed so far as effects are performed in common with the above-described embodiments.

(f) In the above embodiments, regularly reflective sheet-like members with evaporation-deposited silver are employed. However, this imposes no limitation on the present invention.

For instance, regularly reflective sheet-like members made of various metal foils or irregularly reflective sheet-like members such as PET film may be employed.

(g) A sheet-like or plate-like light control member having no flexibility (i.e. so-called prism body), instead of the above-employed flexible prism sheet, may be employed as a light control member disposed along the emission face of the guide plate.

(h) Instead of or in addition to the above-employed prism sheet, a diverse optical element may be disposed along the emission face of the guide plate.

For instance, may be employed a polarization separating sheet capable of transmitting only such illumination light as according to a polarization plane which is to be selectively transmitted by a LCD panel while being capable of selectively reflecting such illumination light as vertical to the polarization plane. A light diffusive sheet having a weak diffusivity may be disposed. Such a light diffusive sheet restrain better the light diffusion elements on the emission face from being conspicuous.

(i) A primary light source provided with an arrangement including a plurality of point-like light source elements such as LEDs may be employed.

(j) The present invention may be applied to uses other than backlighting of LCD.

For instance, applications to various illumination devices or display devices are broadly allowed.

What is claimed is:

1. A surface light source device of side light type comprising:
   a guide plate having an emission face to output illumination light therefrom, a back face and a pair of incidence end faces located oppositely to each other across the guide plate; and
   primary light sources to supply primary light through said pair of incidence end faces, wherein
   said back face of said guide plate is provided with a great number of fine projection rows formed from sloped surface portions that meet along edges which run at approximately right angles with respect to the incidence end faces;
   said emission face being a scattering face to scatter illumination light, the emission face being provided with a scattering power which gets stronger towards a center portion of the emission face, from the respective incidence end faces.

2. A surface light source device of side light type as defined in claim 1, wherein each of said fine projection rows has a triangular cross section.

3. A surface light source device of side light type as defined in claim 1, wherein
   a light control member is disposed along the emission face to modify emission directivity toward a frontal direction of the emission face regarding in a plane perpendicular to the incidence end faces.

4. A liquid crystal display as defined in claim 2, wherein
   a light control member is disposed along the emission face to modify emission directivity toward a frontal direction of the emission face regarding in a plane perpendicular to the incidence end faces.

5. A surface light source device of side light type as defined in claim 1, wherein
   each row of the fine projection rows on the back face is formed from a pair of sloped surface portions,
   the sloped surface portions are formed at an inclination angle with respect to the emission face,
   the inclination angle is in the range of from 50 degrees to 130 degrees.

6. A surface light source device of side light type as defined in claim 1, wherein,
   each row of the fine projection rows on the back face is formed from a pair of sloped surface portions,
   the sloped surface portions are formed at an inclination angle with respect to the emission face, and
   the inclination angle is in the range from 60 degrees to 110 degrees.

7. A surface light source device of side light type as defined in claim 1, wherein
   each row of the fine projection rows on the back face is formed from a pair of sloped surface portions,
   the sloped surface portions are formed at an inclination angle with respect to the emission face, and
   the sloped surface portions have approximately equal inclination angles.

8. A surface light source device of side light type as defined in claim 1, wherein the fine projection rows on the back face are formed that a repetition pitch of 50 $\mu$m or less.

9. A surface light source device as defined in claim 1, wherein the emission face is provided with a great number of dot like light defusing elements to scatter illumination light.

10. A liquid crystal display comprising:
    a liquid crystal display panel; and
    a surface light source device of side light type arranged for backlighting, said surface light source comprising:
    a guide plate having an emission face to output illumination light therefrom, a back face and a pair of incidence end faces located oppositely to each other across the guide plate; and
    primary light sources to supply primary light through said pair of incidence end faces, wherein
    said back face of said guide plate is provided with a great number of fine projection rows formed from sloped surface portions that meet along edges which run at approximately right angles with respect to the incidence end faces;
    said emission face being a scattering face to scatter illumination light, the emission face being provided with a scattering power which gets stronger towards a center portion of the emission face, from the respective incidence end faces.

11. A liquid crystal display as defined in claim 10, wherein each of said fine projection rows has a triangular cross section.

12. A liquid crystal display as defined in claim 10, wherein
    a light control member is disposed along the emission face to modify emission directivity toward a frontal direction of the emission face regarding in a plane perpendicular to the incidence end faces.

13. A liquid crystal display as defined in claim 11 wherein
    a light control member is disposed along the emission face to modify emission directivity toward a frontal direction of the emission face regarding in a plane perpendicular to the incidence end faces.

14. A liquid crystal display as defined in claim 10, wherein
    each row of the fine projection rows on the back face is formed from a pair of sloped surface portions,
    the sloped surface portions are formed at an inclination angle with respect to the emission face, the inclination angle is in the range of from 50 degrees to 130 degrees.

15. A liquid crystal display as defined in claim 10, wherein, each row of the fine projection rows on the back face is formed from a pair of sloped surface portions, the sloped surface portions are formed at an inclination angle with respect to the emission face, and the inclination angle is in the range from 60 degrees to 110 degrees.

16. A liquid crystal display as defined in claim 10, wherein each row of the fine projection rows on the back face is formed from a pair of sloped surface portions, the sloped surface portions are formed at an inclination angle with respect to the emission face, and the sloped surface portions have approximately equal inclination angles.

17. A liquid crystal display as defined in claim 10, wherein the fine projection rows on the back face are formed that a repetition pitch of 50 $\mu$m or less.

18. A liquid crystal display as defined in claim 10, wherein the emission face is provided with a great number of dot like light defusing elements to scatter illumination light.

\* \* \* \* \*

UNITED STATES PATENT AND TRADEMARK OFFICE
CERTIFICATE OF CORRECTION

PATENT NO. : 6,334,690 B1
DATED : January 1, 2002
INVENTOR(S) : Shingo Ohkawa

It is certified that error appears in the above-identified patent and that said Letters Patent is hereby corrected as shown below:

Column 1,
Line 16, change "corresponding" to -- correspondingly --.

Column 6,
Line 47, change "ice" to -- face --.
Line 50, change "ace" to -- face --.

Column 8,
Line 23, change "invention, in" to -- invention. In --.
Line 31, change "regular" to -- rectangular --.
Line 42, change "fight" to -- light --.

Signed and Sealed this

Twenty-first Day of May, 2002

Attest:

*Attesting Officer*

JAMES E. ROGAN
*Director of the United States Patent and Trademark Office*